US011531829B2

(12) United States Patent
Murugaraj et al.

(10) Patent No.: US 11,531,829 B2
(45) Date of Patent: Dec. 20, 2022

(54) AUTOMATIC IMAGE ANNOTATION

(71) Applicant: ACCENTURE GLOBAL SOLUTIONS LIMITED, Dublin (IE)

(72) Inventors: Sridhar Murugaraj, Bangalore (IN); Indrajit Kar, Bangalore (IN); Vishal Pandey, Bangalore (IN); Sushresulagna Rath, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 25 days.

(21) Appl. No.: 16/938,689

(22) Filed: Jul. 24, 2020

(65) Prior Publication Data
US 2022/0027666 A1    Jan. 27, 2022

(51) Int. Cl.
*G06K 9/62* (2022.01)
*G06T 11/00* (2006.01)

(52) U.S. Cl.
CPC ......... *G06K 9/6215* (2013.01); *G06K 9/6255* (2013.01); *G06K 9/6256* (2013.01); *G06T 11/00* (2013.01)

(58) Field of Classification Search
CPC .. G06K 9/6214; G06K 9/6215; G06K 9/6217; G06K 9/6218; G06K 9/6255; G06K 9/6256; G06K 9/6257; G06K 9/6259; G06T 11/00; G06T 11/005; G06V 10/25; G06V 10/20; G06V 20/10; G06V 20/20
USPC ................. 382/155–159, 180, 173, 197, 253
See application file for complete search history.

(56) References Cited

U.S. PATENT DOCUMENTS

| | | | |
|---|---|---|---|
| 10,885,392 B2 * | 1/2021 | Znamenskiy | ........ G06K 9/6257 |
| 2003/0012428 A1 * | 1/2003 | Syeda-Mahmood | ........................ G06F 16/5838 382/162 |
| 2011/0200251 A1 * | 8/2011 | Chin | .................... G06K 9/4642 382/168 |

(Continued)

OTHER PUBLICATIONS

Changbo Yang, Ming Dong and Jing Hua, "Region-based Image Annotation using Asymmetrical Support Vector Machine-based Multiple-Instance Learning," 2006 IEEE Computer Society Conference on Computer Vision and Pattern Recognition (CVPR'06), 2006, pp. 2057-2063, doi: 10.1109/CVPR.2006.250. (Year: 2006).*

(Continued)

*Primary Examiner* — Sean M Conner
*Assistant Examiner* — Stephen M Brinich
(74) *Attorney, Agent, or Firm* — Mannava & Kang, P.C.

(57) ABSTRACT

An automatic image annotation system receives a reference image with one or more parts annotated along with one or more query images and automatically identifies portions from the query images that are similar to the annotated parts of the reference image. The S-matrices of the reference image and the query images are obtained via singular value decomposition (SVD). Lower-dimensional images are also obtained for the reference image and the query images using a pre-trained deep learning model. The S-matrices and the lower-dimensional images of the corresponding images are combined to generate vector representations. A distance metric is calculated for the vector representation of the reference image with that of the query image. A preliminary output image with a preliminary annotation is initially generated. The preliminary annotation is further optimized to generate an optimized annotation that adequately covers the region of interest (ROI).

18 Claims, 12 Drawing Sheets

(56) References Cited

U.S. PATENT DOCUMENTS

| 2016/0232157 | A1* | 8/2016 | Mansour | G06K 9/00483 |
|---|---|---|---|---|
| 2017/0083623 | A1* | 3/2017 | Habi | G06V 10/82 |
| 2019/0147221 | A1* | 5/2019 | Grabner | G06T 7/75 |
| | | | | 382/103 |
| 2020/0250497 | A1* | 8/2020 | Peng | G06V 10/32 |
| 2020/0265231 | A1* | 8/2020 | Li | G06K 9/627 |

OTHER PUBLICATIONS

I. Kokkinos and p. Maragos, "Synergy between Object Recognition and Image Segmentation Using the Expectation-Maximization Algorithm," in IEEE Transactions on Pattern Analysis and Machine Intelligence, vol. 31, No. 8, pp. 1486-1501, Aug. 2009, doi: 10.1109/TPAMI.2008.158. (Year: 2009).*

Yan, Ziang, Jian Liang, Weishen Pan, Jin Li and Changshui Zhang. "Weakly- and Semi-Supervised Object Detection with Expectation-Maximization Algorithm." ArXiv abs/1702.08740 (2017): n. pag. (Year: 2017).*

Oluwasammi, A., Aftab, M. U., Qin, Z., Son, T. N., Thang, V. D., Nguyen, S. B., . . . Giang, H. N. (2021). Features to text: A comprehensive survey of deep learning on semantic segmentation and image captioning. Complexity, 2021 doi:http://dx.doi.org/10.1155/2021/5538927 (Year: 2021).*

La Cascia Marco et al., "Automatic Image Annotation Using Random Projection in a Conceptual Space Induced from Data", 2018 14th International Conference on Signal-Image Technology & Internet-Based Systems (SITIS), IEEE Computer Society, Nov. 26, 2018, pp. 464-471.

* cited by examiner

AUTOMATIC IMAGE ANNOTATION

BACKGROUND

Image annotation and labeling is an essential ingredient for particular forms of machine learning (ML) specifically for supervised learning algorithms. During the training phase, a supervised learning algorithm measures the accuracy of a model by generating predictions and comparing them to labels associated with the data. A typical example of this is image classification wherein training an image classification model requires images that are annotated and/or labeled. Each image contains one of the many labels indicating the object captured in the image such as a person, a car, a dog, etc. Modified National Institute of Standards and Technology (MNIST) and Canadian Institute For Advanced Research (CIFAR10) and ImageNet are all examples of public domain data sets that have already been labeled and often used for training. During the training phase, checks can be performed to see if the predicted classification performed on the image matches the associated label directions. If the image classification model can classify the images with adequate accuracy, then the training is halted and the image classification model is deemed ready for use. Else, the training of the image classification model continues until such a time that the predictions reach a desired level of accuracy.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
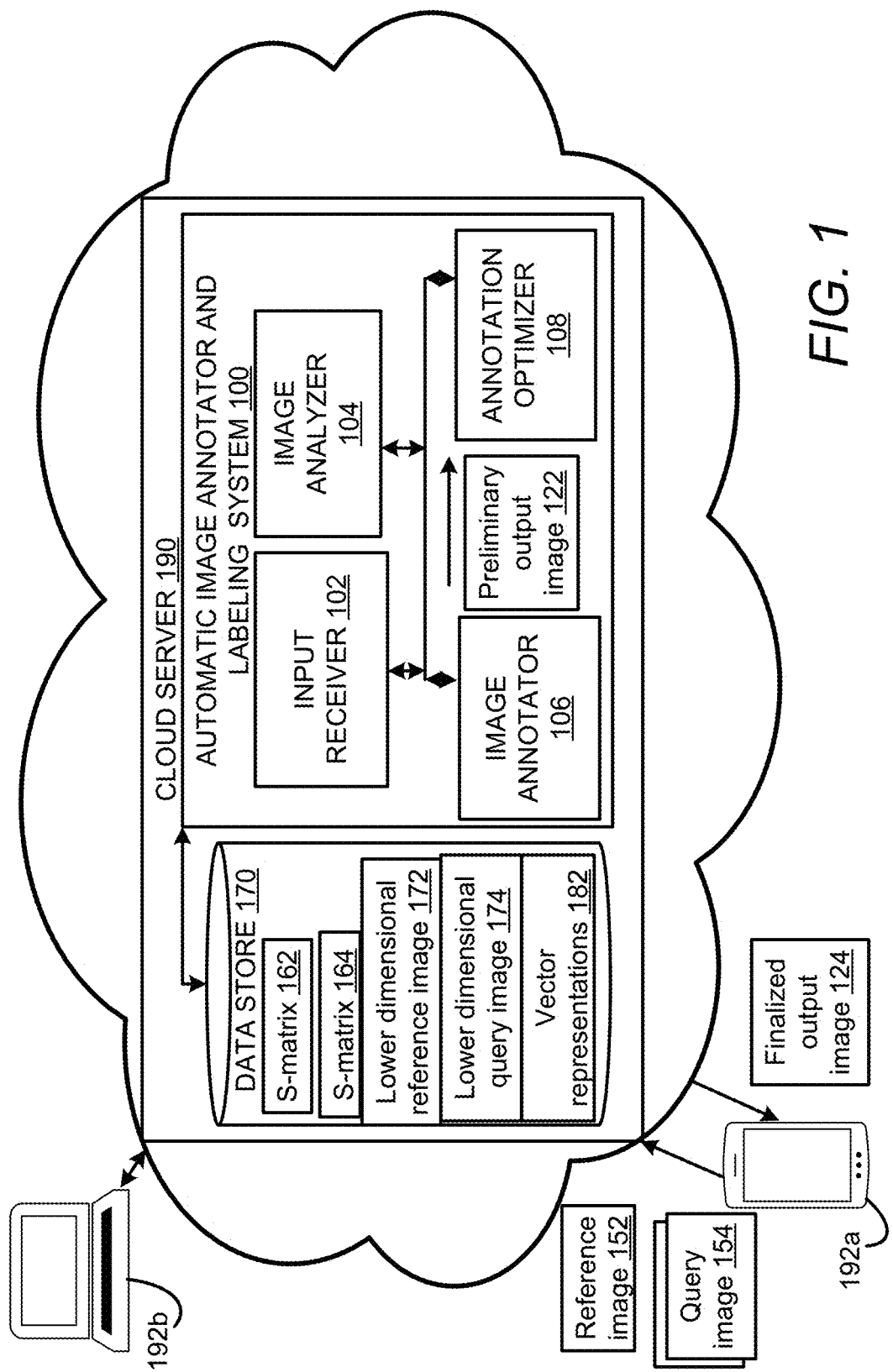
FIG. 1 shows a block diagram of the automatic image annotation system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An automatic image annotation system that receives a reference image that includes one or more annotations along with at least one query image and automatically annotates the query images is disclosed. The reference image and the at least one query image can include objects of the same or different classes. But the reference image and the query image also include regions of interest with a similarity that can be identified by the human eye as well as by image analysis machines. The annotation(s) on the reference image can include one or more markings in the form of open or closed geometric figures that highlight the ROI which can include specific objects or portions of specific objects captured in the reference image. The automatic image annotation system provides an annotation that is substantially similar in size, appearance, and position to the annotation in the reference image. Therefore, an annotation is automatically generated for a region in the query image that is identified as being similar to the region highlighted by the annotations in the reference image.

The reference image and the query image are initially processed via SVD to obtain a corresponding singular value diagonal matrix or the S-matrix for each of the reference image and the one or more query images. Also, a lower-dimensional reference image and a lower-dimensional query image are generated by a pre-trained deep learning model. A target annotation2vec which is a vector representation for the reference image is generated from the S-matrix of the reference image and the low dimensional reference image. Similarly, a query image2vec which is a vector representation of the query image is also generated from the S-matrix of the query image and the low dimensional query image. A distance metric is calculated between the vector representation of the reference image and the vector representation of the query image. As a result, a preliminary output image is generated which includes a preliminary annotation on the query image. However, the preliminary annotation may not accurately delineate the entire ROI in the query image in a manner that is substantially similar to the annotations in the reference image. Rather, if the preliminary annotation is a closed geometric figure, e.g., a boundary box, it may only partially enclose the ROI. Therefore, the preliminary annotation is adjusted or resized to more accurately cover the ROI in the query image that corresponds to the annotated ROI in the reference image. An improper preliminary annotation that does not adequately cover the ROI in the query image can be optimized via implementing the expectation maximization (EM) algorithm which is an iterative process that enables identifying the area around and outside the preliminary annotation which can be included within the annotation. The EM algorithm is based on a threshold value or epsilon value that can be determined either manually or automatically via an ML-based model which can include linear regression models or non-linear regression models. The ML-based model is trained on training data which can include different images wherein each image includes one or more optimized annotations and the training data further includes threshold values corresponding to the optimized annotations.

Training of ML models for various purposes such as object detection, image segmentation, image classification or image to text conversion, etc., requires labeled training data which may include annotated and/or labeled images, for the supervised ML purposes. However, generating the labeled training data requires time and effort. Furthermore, if the training data includes errors, the ML models may not achieve sufficient accuracy to be used in production systems. The automatic image annotation system disclosed herein enables a technical solution for generating training data on a large scale within a short period by automatically annotating images. The automatic annotation of images not only produces a large volume of training data but also mitigates errors that might arise in the training data. The automatic image annotation system improves techniques such as template matching which simply identify locations of a given template image within a larger image. More particularly, the automatic image annotation system provides for an unsupervised process of annotating images. A single annotated reference image provides the necessary input for the automatic image annotation system to process the image embeddings as well as the area to be annotated irrespective of the position of the ROI in the query images. Furthermore, the automated annotation system employs lightweight algorithms so that a single input annotation is adequate to find similar objects. The accuracy of the automated annotation system is further enhanced via the use of Bayesian Statistical techniques such as the EM. The automated annotation system can be made available not only as a cloud service shared between users but also as a stand-alone service for specific users.

FIG. 1 shows a block diagram of the automatic image annotation system 100 in accordance with the examples disclosed herein. In an example, the automatic image annotation system 100 can be hosted on a cloud server 190 and is accessible to different user devices 192a, 192b, etc. The automatic image annotation system 100 can be configured to receive from one of the user devices, e.g., the user device 192a, a reference image 152 wherein at least a portion of an imaged object is annotated (i.e., the ROI) and at least one query image 154 without any annotations. The automatic image annotation system 100 analyzes the reference image 152 with the annotation and the query image 154 as detailed herein to automatically generate one or more annotations on the query image 154 in a manner that is similar to the one or more annotations included in the reference image 152. The reference image 152 and the query image 154 can include objects which may belong to similar or different classes. However, the reference image 152 and the query image 154 include at least certain similar image regions wherein the image region in the reference image 152 similar to an image region of the query image 154 is annotated and forms the ROI. An example with objects of the same class can include the reference image 152 with an annotated backside of a car of a particular make and model e.g., a Honda hatchback with a number plate while the query image 154 includes a car of a different make and model such as a sportscar e.g., a Ferrari. The automatic image annotation system 100 is configured to identify annotate the backside of the Ferrari in the query image 154 based on an input of a single reference image. In another example, the reference image 152 can include an image of a door with a number while the query image 154 includes a street sign and/or a letterbox with a number. Here, the objects in the images are of different classes while having similar regions of interest that include numbers. While only a single reference image with the annotation needs to be provided to the automatic image annotation system 100, one or more query images each having different objects but regions of interest similar to the ROI of the reference image 152 may be supplied for annotation. It can be appreciated that the objects and models are discussed herein for illustration purposes only and that the automatic image annotation system 100 can be configured to receive a reference image and one or more query images of any living or non-living objects for annotation as described herein.

The automatic image annotation system 100 includes an input receiver 102, an image analyzer 104, an image annotator 106, and an annotation optimizer 108. The input receiver 102 receives the reference image 152 including the annotation and the query image 154 uploaded by the user device 192a. The reference image 152 and the query image 154 can include image data of different formats, e.g., .jpeg, .png, .gif, etc. The image analyzer 104 is configured to generate a sigma matrix or an S-matrix for each of the reference image 152 and the query image 154 via singular value decomposition. Accordingly, two S-matrices 162 and 164 can be generated by the image analyzer 104 and stored in a data store 170 that is used to store received information and information that is generated during the operation of the automatic image annotation system 100. If more than one query image is received, then an S-matrix is generated for each of the query images. Furthermore, the image analyzer 104 is also configured to generate a lower-dimensional image for each of the received images. Accordingly, a lower-dimensional reference image 172 corresponding to the reference image 152 and a lower-dimensional query image 174 corresponding to the at least one query image 154 are generated. In an example, the images received from the user device 192a can be provided to a pre-trained deep learning network to generate the lower-dimensional images.

The S-matrices 162 and 164 and the lower-dimensional images 172 and 174 are used to generate vector representations of the received images including the reference image 152 and the query image 154. Therefore, a target annotation2vec and a query image2vec are generated as vector representations 182 corresponding to the reference image 152 and the query image 154. The vector representations 182 including the target annotation2vec and the query image2vec are supplied to the image annotator 106. The image annotator 106 determines a distance metric between the reference image 152 and the query image 154 based on the vector representations 182—the target annotation2vec and the query image2vec. Various distance metrics as detailed herein can be used. Based on the distance metric, a preliminary output image 122 is generated wherein the preliminary output image 122 includes the query image 154 with a preliminary output annotation that covers at least a portion of the ROI in the query image 154 which is similar to the annotated ROI in the reference image 152.

The preliminary output annotation in the preliminary output image 122 may not accurately delineate the ROI in the query image. For example, the preliminary output annotation may cover a larger or smaller area than the ROI in the query image 154. Therefore, the annotation optimizer 108 employs optimization procedures to adjust the size of the preliminary output annotation to generate a finalized output image 124 with a finalized annotation that accurately covers the entire ROI in the query image 154. In an example, the annotation optimizer 108 can implement an optimization procedure based for example, on EM.

Figure 2:
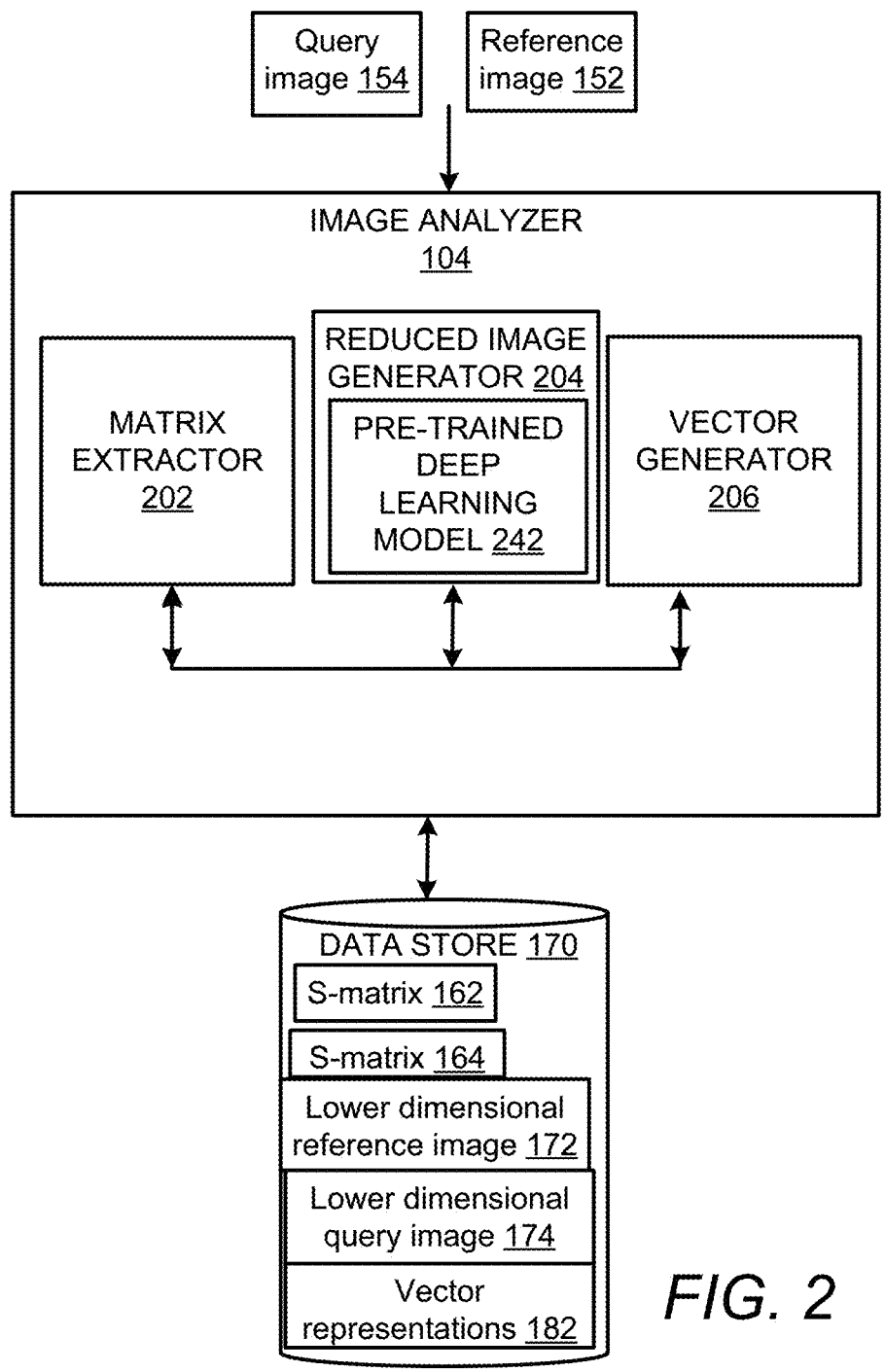
FIG. 2 shows a block diagram of an image analyzer in accordance with the examples disclosed herein.

FIG. 2 shows a block diagram of the image analyzer 104 in accordance with the examples disclosed herein. The image analyzer 104 includes a matrix extractor 202, a reduced image generator 204, and a vector generator 206. The matrix extractor 202 extracts the S-matrix 162 of the reference image 152 and the S-matrix 164 of the query image 154 from the SVD of the corresponding image matrices. Each Sigma or S-matrix contains the topic "singular values" in a square diagonal matrix. The S-matrix can be indicative of the amount of information that is captured.

The reduced image generator 204 generates lower-dimensional images which include the lower-dimensional reference image 172 representative of the reference image 152 and the lower-dimensional query image 174 corresponding to the query image 154. The reduced image generator 204 can include a pre-trained deep learning model 242 which requires no further training to generate the lower-dimensional images. Rather, the terminal layer of the pre-trained deep learning model 242 is discarded in order to obtain the lower-dimensional images. In an example, the pre-trained deep learning model 242 can include a 34-layer Residual Neural Network (ResNet). The vector generator 206 accesses the S-matrix 162 and the S-matrix 164 along with the lower-dimensional reference image 172 and the lower-dimensional query image 174 to obtain the vector representations 182 which include the target annotation2vector corresponding to the reference image 152 and the query image2vector corresponding to the query image 154. More particularly, the vector generator 206 can combine the S-matrix 162 with a matrix representation (e.g., an image matrix) associated with the lower-dimensional reference image 172 via a matrix operation (e.g., matrix multiplication) to generate the target annotation2vector corresponding to the reference image 152. The query image2 vector corresponding to the query image 154 may also be generated similarly via a matrix operation between the S-matrix 164 and the lower-dimensional query image 174.

Figure 3:
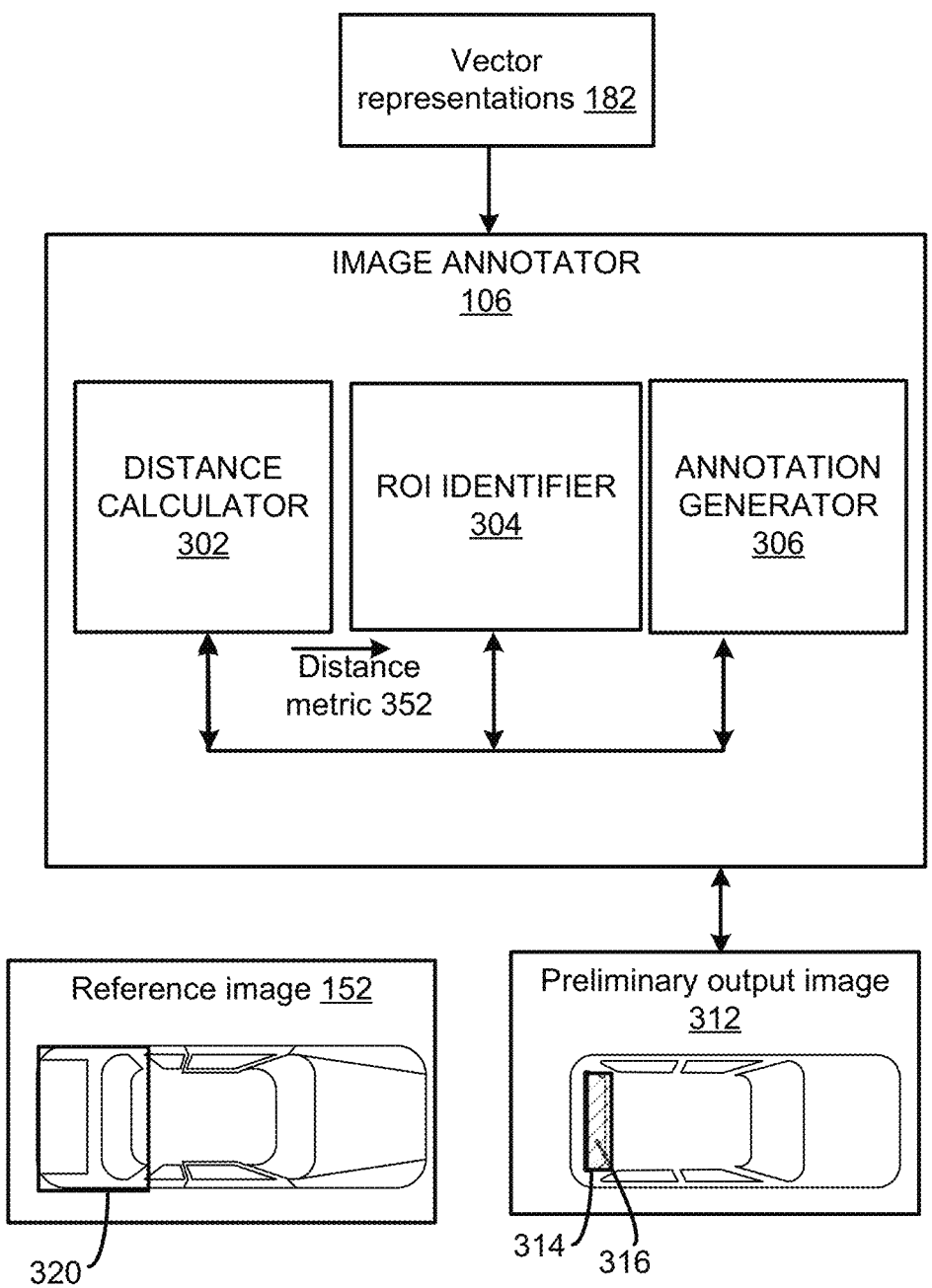
FIG. 3 shows a block diagram of an image annotator in accordance with the examples disclosed herein.

FIG. 3 shows a block diagram of the image annotator 106 in accordance with the examples disclosed herein. The image annotator 106 includes a distance calculator 302, an ROI identifier 304, and an annotation generator 306. The image annotator 106 accesses the vector representations 182 and calculates a distance metric 352 between the vector representations 182. The distance metric 352 is a measure of different between two entities that can be represented or obtained using various methods. The simplest example of a distance metric might be the absolute difference between two numbers representing the two different entities or properties or images in the present instance. A metric or distance function is a function d(x,y) that defines the distance between elements of a set as a non-negative real number. If the distance is zero, both elements are equivalent under that specific metric. A typical distance for real numbers is the absolute difference, $$d:(x,y) \mapsto |x-y| \qquad \text{Eq. (1)}$$

After processing the reference image 152 and the query image 154, the vector representations 182 of real numbers are produced. Different parts of the images can be represented as different components of the corresponding vector representations that represent the images in n-dimensional Euclidean space. Similar images are closer together in the vector space. In an example, cosine distance measure can be employed by the distance calculator 302 to obtain the distance metric. Based on the distance metric, between the various components of the vector representations 182, the ROI identifier 304 is enabled to identify at least a portion of the ROI i.e., the preliminary ROI 316 from the query image 154 that would be similar (or closer to) the annotated part of the object in the reference image 152. In an example, a pixel-by-pixel distance comparisons can be executed by the ROI identifier 304 to identify the preliminary ROI 316 from the query image 154. In an example, a preset threshold distance can be used by the ROI identifier 304 to determine the similarity between the pixels in the query image 154 to the pixels in the reference image 152. The positions of the similar pixels from the query image 154 can be provided to the annotation generator 306 to produce a preliminary output image 312 with a preliminary annotation 314 around the preliminary ROI 316.

The preliminary annotation 314 can be similar in shape and/or color to the reference annotation 320 of the reference image while the position of the preliminary annotation 314 within the preliminary output image 312 depends on the image region that is identified as the preliminary ROI 316. If the annotation of the reference image 152 is an open figure such as an arrow, a line, etc., that points to the ROI as opposed to enclosing the ROI in the reference image 152, then the process of automatic annotation generation may be terminated with the generation of the preliminary annotation 314. However, if the annotation in the reference image 152 encloses the ROI such as the reference annotation 320, then further optimization may be required. This is because the preliminary ROI 316 is identified based on the regional similarity between the annotated part of the reference image 152 and corresponding portions of the query image 154. The preliminary ROI 316 is therefore delineated by the preliminary annotation 314 which should ideally cover the entire ROI corresponding to the query image 154 in the preliminary output image 312. However, due to different reasons the preliminary annotation 314 may not delineate the entire ROI in the query image 154 as accurately done in the reference image 152. This is shown, for example, in the comparison of the details of the reference image 152 and the preliminary output image 312 wherein a reference annotation 320 covers an entire backside of the car in the reference image 152 whereas the preliminary annotation 314 covers only the back windshield of the car in the preliminary output image 312. The annotation optimizer 108 optimizes the preliminary annotation 314 so that the ROI is identified more accurately as detailed herein.

Figure 4:
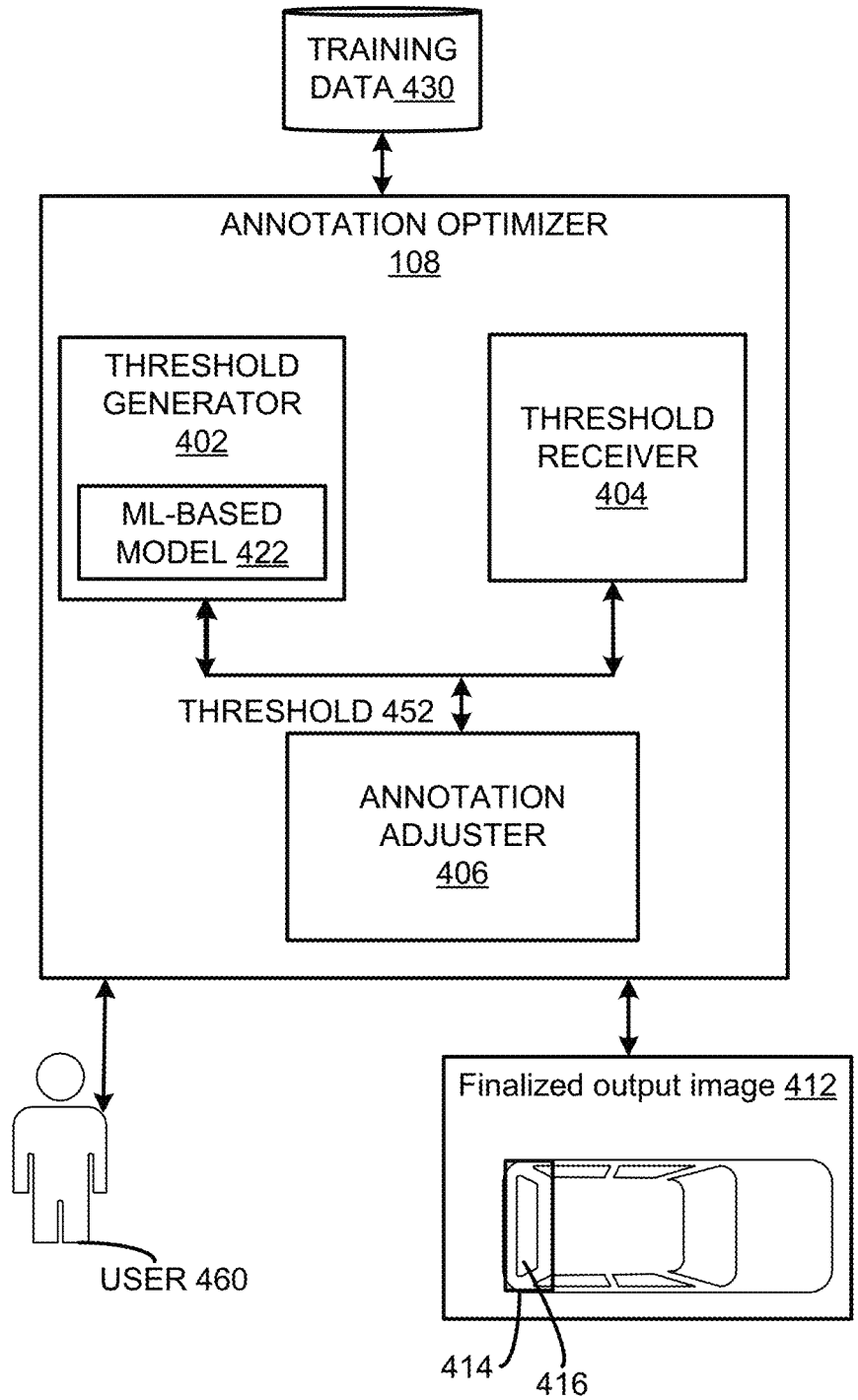
FIG. 4 shows a block diagram of an annotation optimizer in accordance with the examples disclosed herein.

FIG. 4 shows a block diagram of the annotation optimizer 108 in accordance with the examples disclosed herein. The annotation optimizer 108 includes a threshold generator 402, a threshold receiver 404, and an annotation adjuster 406. Optimization is the process of modifying a parameter or target variable to achieve optimum value. In an example, the annotation optimizer 108 can implement an optimization process based on EM. The EM algorithm enables finding maximum-likelihood estimates for model parameters when the data is incomplete, has missing data points, or has unobserved (hidden) latent variables. It is an iterative way to approximate the maximum likelihood function. More specifically, the annotation optimizer 108 is configured to find the area around the preliminary annotation 314 (or the boundary box) which covers the similar distribution of pixel values as the area within the reference annotation 320. Thus, the boundary box or the preliminary annotation 314 is resized to accommodate the entire ROI of the query image. The optimization can be controlled using a threshold 452 or an 'epsilon' parameter which is the measure of the difference between the distributions that represent the images. In an example, the annotation optimizer 108 uses the absolute difference between the mean of the distributions. However, the choice is not limited to this particular selection. Any metric can be used for this purpose including KL-Divergence, for instance, to estimate the similarity/difference of both distributions. The threshold 452 value depends on an object captured in the images. Different objects such as cars, houses, dogs, balls, etc., can have different thresholds. The threshold 452 can determine the extent to which the preliminary annotation 314 needs to be adjusted to optimally cover the ROI of the query image to the extent covered by the reference annotation 320. In an example, the value for the threshold 452 can be received from a user 460 in response to a display of the preliminary output image 312 using a dashboard which is one of the user interfaces that may be put forth by the automatic image annotation system 100 for user interactions that enable receiving data and outputting the results. When the threshold is provided by the user 460, the threshold receiver 404 obtains the threshold 452 and provides it to the annotation adjuster 406 to adjust the preliminary annotation 314. However, threshold 452 can also be automatically generated by the threshold generator 402. In an example, the threshold generator 402 can include an ML-based model 422 which is trained using training data 430. The training data 430 can include various images with annotations and the corresponding thresholds (or epsilon values) to be used to generate the annotations accurately. The threshold 452 thus generated can be provided to the annotation adjuster 406 which causes resizing of the annotation to generate a finalized annotation 414. A finalized output image 412 is provided with the finalized annotation 414 that accurately covers the entire ROI 416 in a manner that is similar to the ROI covered by the reference annotation 320 in the reference image 152.

Figure 5:
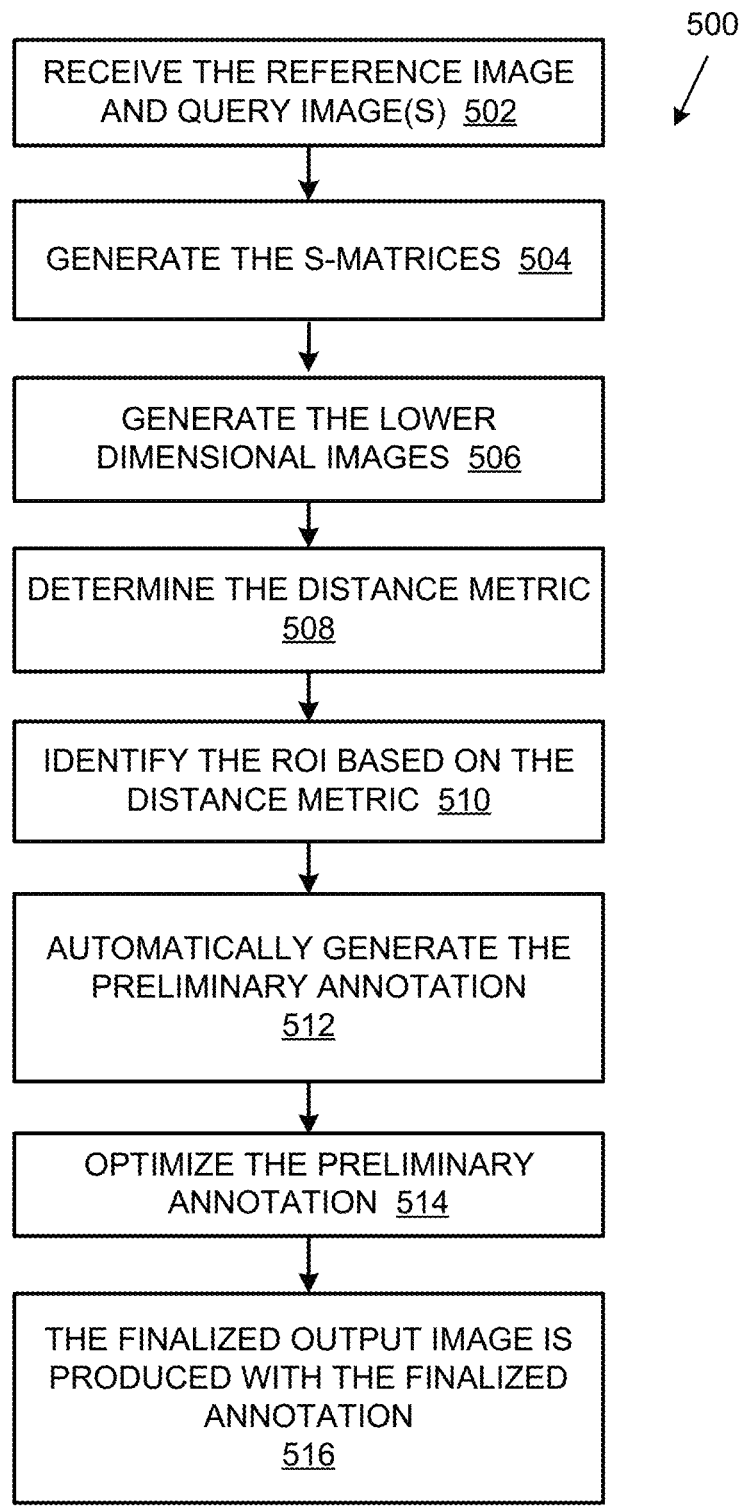
FIG. 5 shows a flowchart that details a method of automatically annotating images in accordance with examples disclosed herein.

FIG. 5 shows a flowchart 500 that details a method of automatically annotating images in accordance with examples disclosed herein. The method begins at 502 wherein the reference image 152 with the reference annotation 320 and the query image 154 with no annotations are received. While only one annotated reference image is needed, a plurality of query images can be uploaded to the automatic image annotation system 100 for automatic annotation as described herein. At 504, the S-matrix 162 (or the singular value diagonal matrix) for the reference image 152 and the S-matrix 164 the query image 154 are obtained via the SVD process. At 506, the lower-dimensional reference image 172 for the reference image 152 and the lower-dimensional query image 174 for the query image 154 are generated by the pre-trained deep learning model 242. The S-matrices 162, 164, and the corresponding lower-dimensional images 172, 174 are used at 506 to generate the vector representations 182 which include the target annotation2vector and query image2vector for the reference image 152 and the query image 154 respectively. The distance metric 352 is determined at 508 between the target annotation2vector and the query image2vector using one of the various distance metric measures such as Euclidean distance metric, Cosine distance metric, etc. Based on the distance metric 352, the preliminary ROI 316 is initially identified in the query image 154 at 510. The preliminary annotation 314 around the preliminary ROI 316 is automatically generated by the annotation generator 306 at 512. The preliminary annotation 314 is further optimized at 514 to produce the finalized output image 412 at 516 with the finalized annotation 414.

Figure 6:
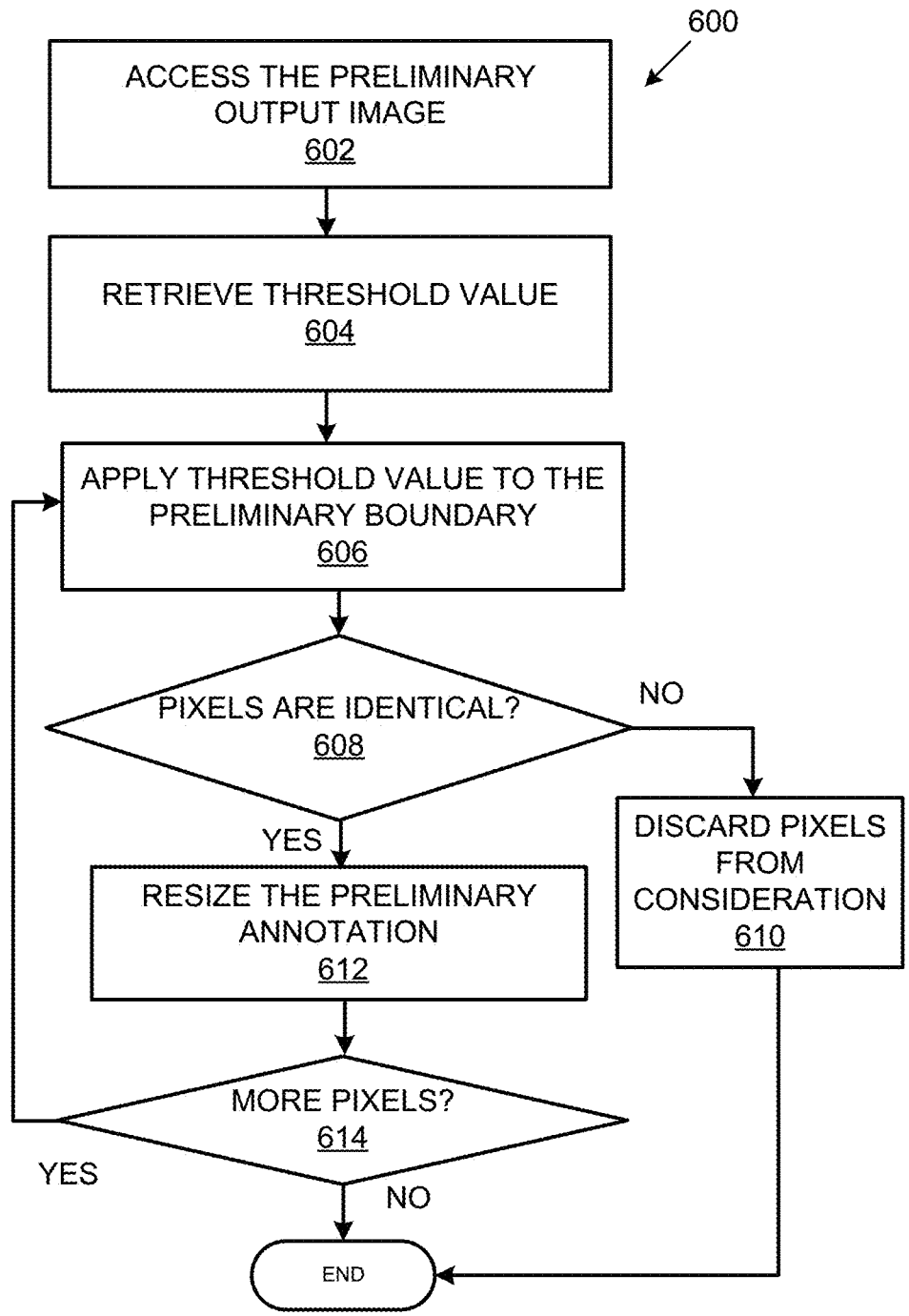
FIG. 6 shows a flowchart that details a method of optimizing the annotation in accordance with the examples disclosed herein.

FIG. 6 shows a flowchart 600 that details a method of optimizing the annotation via accurately identifying the ROI in accordance with the examples disclosed herein. The method begins at 602 wherein the preliminary output image 312 with the preliminary annotation 314 and the preliminary ROI 316 is accessed. At 604, the threshold 452 or the epsilon value is retrieved. The threshold 452 retrieved at 604 can be supplied manually by the user 460 or may be automatically generated by the ML-based model 422. The threshold 452 is applied to the boundary of the preliminary annotation 314 at 606. More particularly, the pixels beyond the boundary up to the threshold limit can be compared with the pixels within the preliminary ROI 316. It is determined at 608 if the pixels within the preliminary ROI 316 are identical to the pixels beyond the boundary of the preliminary annotation 314 and up to the threshold limit. If it is determined at 608 that the pixels beyond the preliminary ROI 316 are not identical, then the pixels are discarded from consideration at 610 and the process terminates on the end block. If it is determined at 608 that the pixels beyond the preliminary ROI 316 are identical to the pixels in the preliminary ROI 316, then the preliminary annotation 314 is resized or expanded at 612 to include the identical pixels. The method moves to 614 to determine if further pixels remain to be processed. If no further pixels remain for processing, the method terminates on the end block. If it is determined at 614 that further pixels remain for processing, then the method returns to 606 to apply the threshold to the boundary of the expanded or resized annotation.

Figure 7:
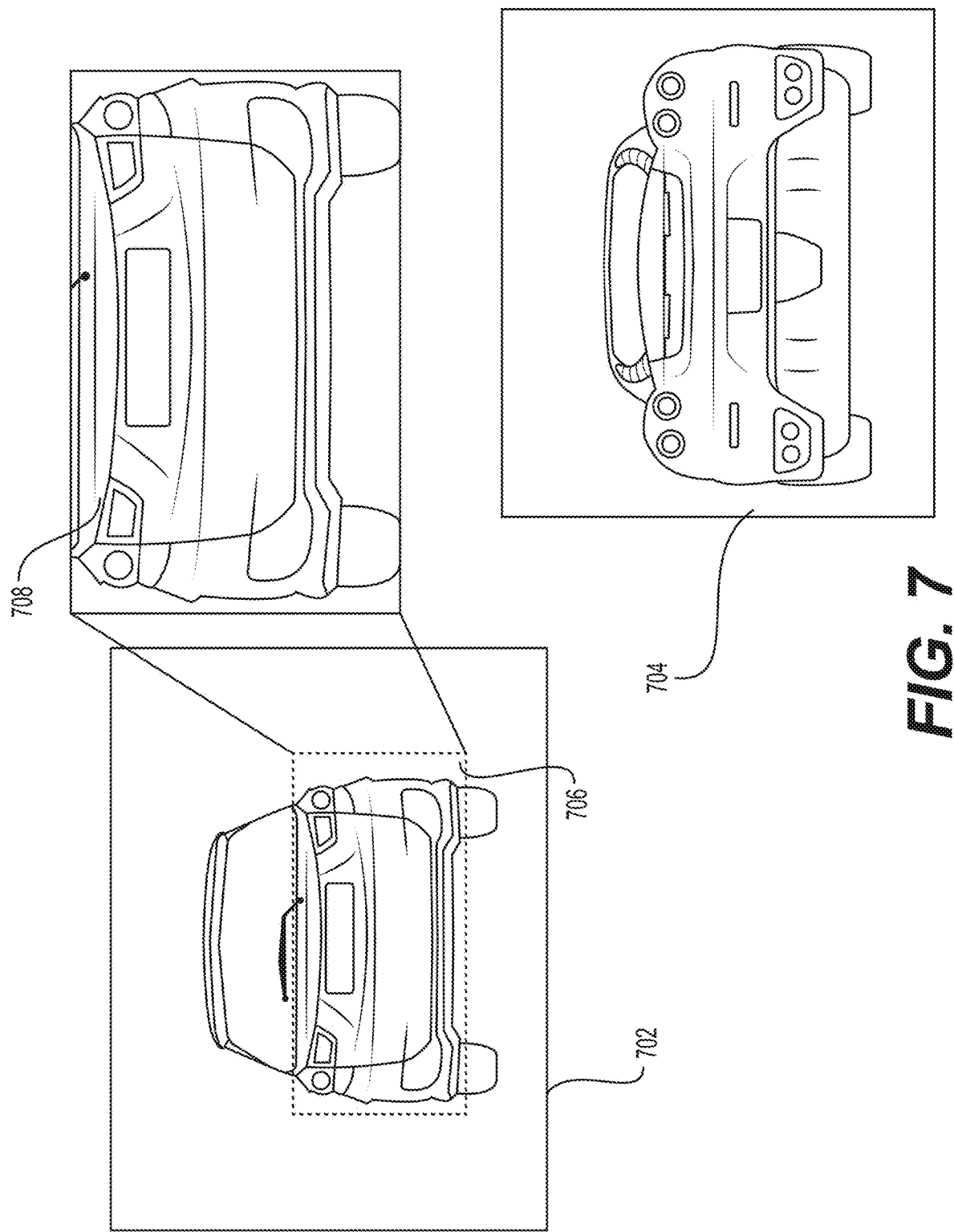
FIG. 7 shows an example reference image and an example query image.

FIG. 7 shows an example reference image 702 and an example query image 704 in accordance with the examples disclosed herein. The example reference image 702 includes an annotation which forms a bounding box 706 that covers the trunk of the car. Before being used for automatic annotation, the example reference image 702 can be processed to extract the annotated portion 708 of the example reference image 702. The annotated portion 708 and the example query image 704 can be processed as described herein so that the automatic image annotation system 100 can identify and annotate the rear end of the car shown in the example query image 704 like the annotation in the example reference image 702.

Figure 8:
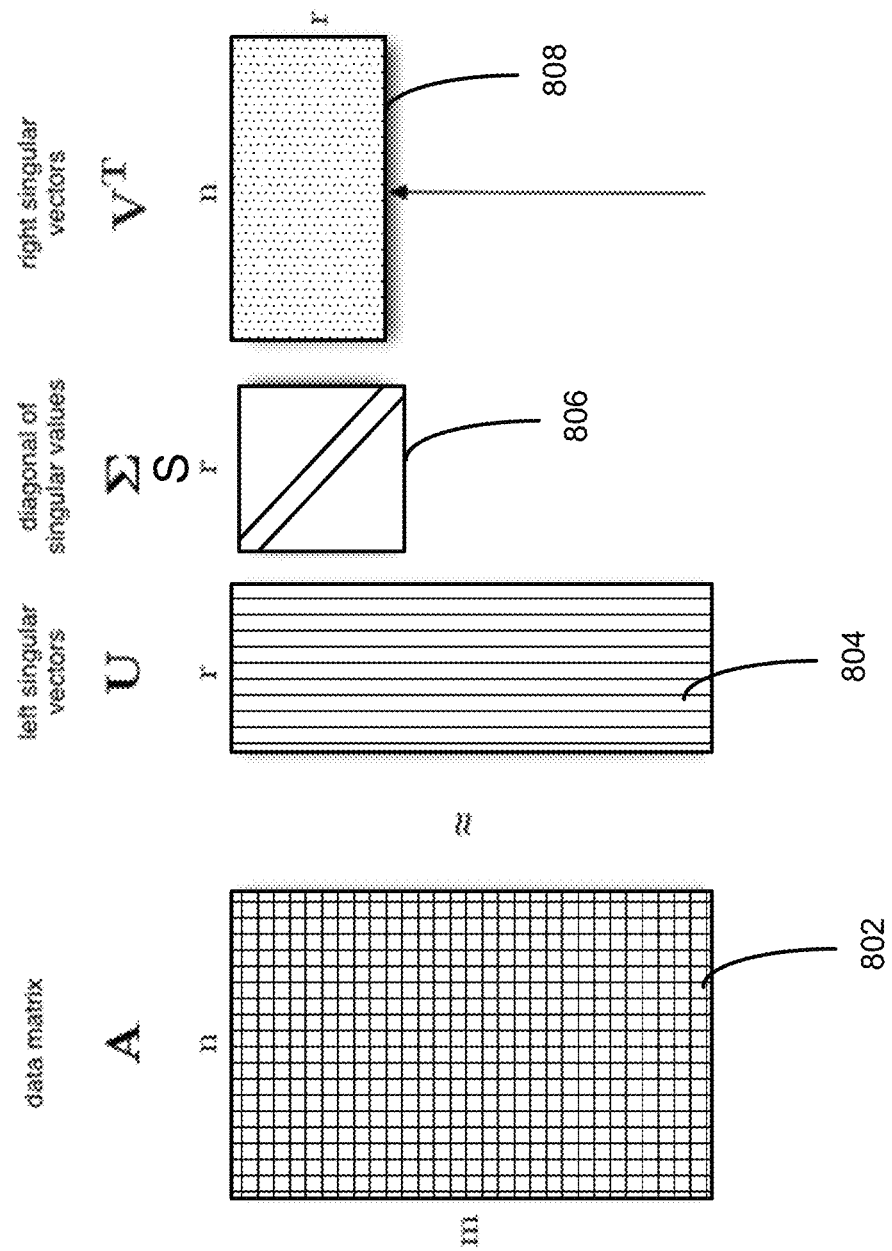
FIG. 8 shows a block diagram that illustrates the usage of singular value decomposition (SVD) for automatic annotation of images in accordance with the examples disclosed herein.

FIG. 8 shows a block diagram that illustrates the usage of SVD for automatic annotation of images in accordance with the examples disclosed herein. SVD is a dimensionality reduction technique and is also a factorization of a real or complex matrix, e.g., the data matrix A 802, that generalizes the eigen decomposition of a square normal matrix to any m*n matrix via an extension of the polar decomposition. Specifically, the SVD of an m*n real or complex matrix A 802 is a factorization of the form U Sigma V*, where U is an m*m real or complex unitary matrix 804, Sigma is an m*n rectangular diagonal matrix 806 with non-negative real numbers on the diagonal, and V is an n*n real or complex unitary matrix 808.

$$A(m \times n) = U(m \times m) \cdot S(m \times n) \cdot VT(n \times n) \qquad \text{Eq. (2)}$$

Calculating the SVD consists of finding the eigenvalues and eigenvectors of AAT and ATA, wherein T is the transpose matrix of A. The eigenvectors of ATA make up the columns of the n*n real or complex unitary matrix V 808, the eigenvectors of AAT make up the columns of U the m*m real or complex unitary matrix 804. Also, the singular values in S are square roots of eigenvalues from AAT or ATA. The singular values are the diagonal entries of the S-matrix and are arranged in descending order. The singular values are always real numbers. If the matrix A is a real matrix, then U and V are also real.

The SVD transformation is invoked mainly in several applications, such as image compression, image hiding, watermarking, noise reduction, and image watermarking. The SVD of an M×M matrix referred to as Rm, which represents the input image, is a decomposition of the form Rm=USV. As mentioned above, U and V are orthogonal matrices, and S is a diagonal matrix consisting of the singular values of Rm. The singular values s1≥s2≥ . . . sm≥0 are in descending order along the main diagonal of S. These singular values are obtained by calculation of the square root of the eigenvalues of RmRmT and RmTRm. The singular values are unique; however, the matrices U and V are not unique. Hence, the matrices U 804 and V 806 are discarded from further processing by the automatic image annotation system 100 in the automatic image annotation process. The middle singular matrix or the S-matrix can be extracted using a function:

$$U, sigma, V = np.linalg.svd(imgmat),$$

wherein, svd(imgmat) enables obtaining the svd of the image matrix of the reference image 152 and np.linalg enables decomposing the reference image 152 into singular values.

Figure 9:
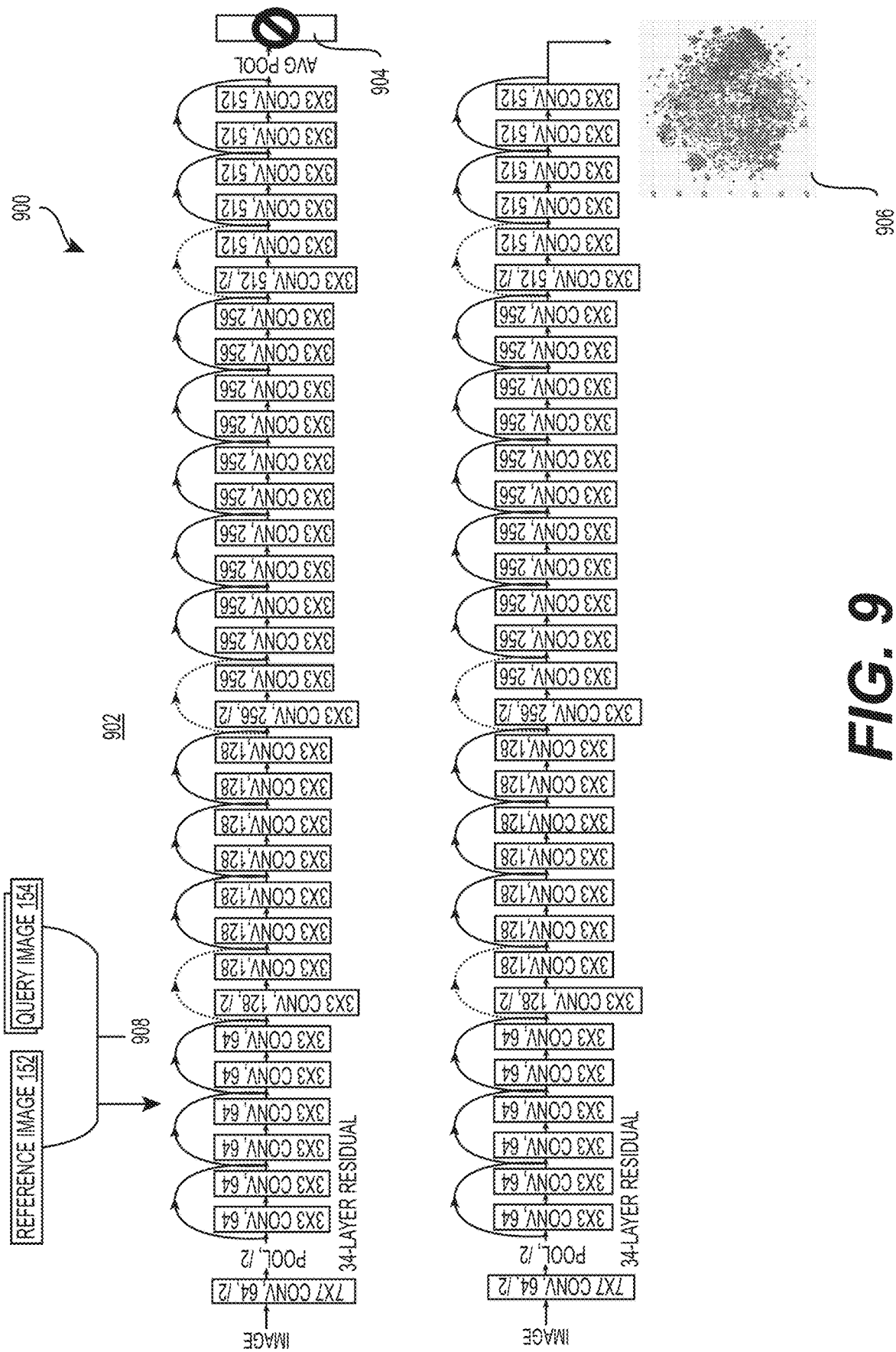
FIG. 9 shows a schematic diagram of a pre-trained deep learning model used for generating lower-dimensional images in accordance with the examples disclosed herein.

FIG. 9 shows a schematic diagram 900 of the pre-trained deep learning model 242 used for generating the lower-dimensional images in accordance with the examples disclosed herein. The convolution-based deep learning models can be employed for most of the tasks related to images including classification, segmentation, etc. These models follow a hierarchical structure called layers as shown in representation 902. These layers capture the features of the input images 908 e.g. the reference image 152 and the query image 154 and encode the input images into an N-dimensional Euclidean space. The vector obtained from the last layer of the model encapsulates the features of the input images and could serve as low dimensional representation for subsequent processing.

The schematic diagram 900 shows a 34 layer ResNet 902 from which the final layer 904 is discarded. The output of the last MaxPooling2D operation can include one or more feature maps, e.g., feature map 906. Using the transfer learning from the pre-trained deep learning model 242 enables using the latent feature maps, extracting them and then finding the mutual features between two images which enables automatically annotating the query image 154 based on the reference image 152. The automatic image annotation system 100 combines the feature maps with SVD to match the ROIs on the reference images and query images. Therefore, the mutual information between the two images is maximized before estimating the distance metric.

Figure 10:
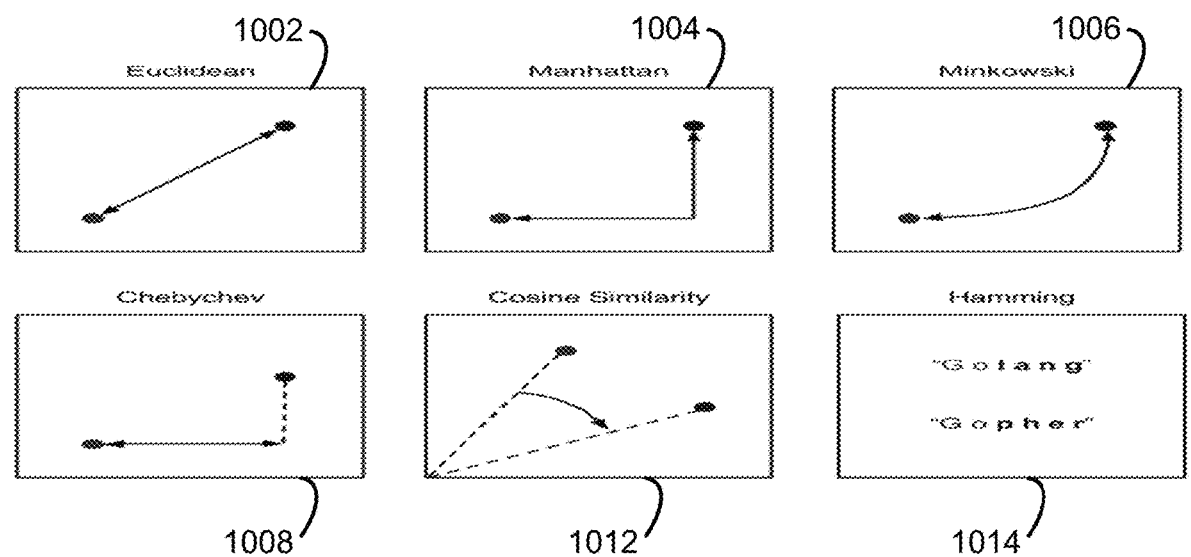
FIG. 10 shows the various distance metrics that can be employed by the automatic image annotation system in accordance with the examples disclosed herein.

FIG. 10 shows the various distance metrics that can be employed by the automatic image annotation system 100 in accordance with the examples disclosed herein. Some example distance plots and/or equations are shown. The Euclidean distance metric 1002 determines the straight line distance between two points in the Euclidean space. The Euclidean distance between two points is the length of the line segment connecting the two points. The Manhattan distance metric 1004 is another metric that can be employed by the automatic image annotation system 100 for the automatic annotation generation. Manhattan distance is the distance between two points measured along the axes at right angles. The Minkowski distance 1006 is a metric in a normed vector space which can be considered as a generalization of both the Euclidean distance and the Manhattan distance. The Chebyshev distance 1008 is the maximum metric, or L-metric is a metric defined on a vector space where the distance between two vectors is the greatest of their differences along any coordinate dimension. Cosine similarity 1012 measures the similarity between two vectors of an inner product space. It is measured by the cosine of the angle between two vectors. While cosine similarity is often used to measure document similarity in text analysis, the automatic image annotation system 100 uses cosine similarity to measure the distance between vector representations obtained from the S-matrices and the lower-dimensional images of the reference image and the query images. Hamming distance 1014 is another distance metric that can be employed by the automatic image annotation system 100. Hamming distance 1014 between two strings of equal length is the number of positions at which the corresponding symbols are different.

Figure 11:
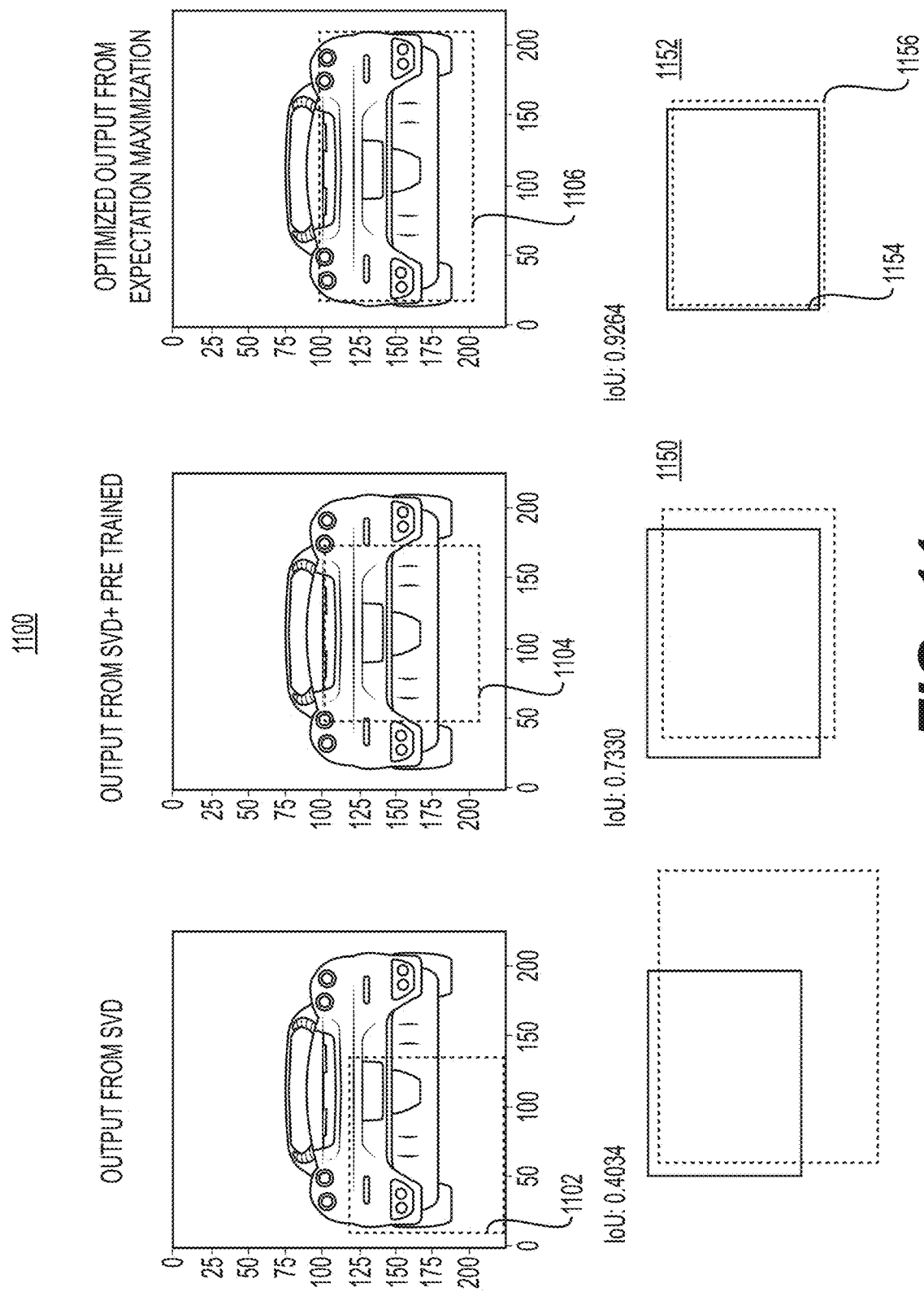
FIG. 11 shows the annotations that are generated at various steps during the automatic annotation generation process in accordance with the examples disclosed herein.

FIG. 11 shows the annotations that are generated at various steps during the automatic annotation generation process and the various bounding boxes that are generated during the optimization process for the various threshold values in accordance with the examples disclosed herein. Different annotations are shown in the example query image 704. The SVD output annotation 1102 which is obtained automatically using only the S-matrix from the SVD does not cover the rear end of the car in the example query image 704. The SVD+pre-trained output 1104 which is obtained via combining the S-matrix 164 with the lower-dimensional query image 174 covers the rear end of the car adequately. However, when compared to the annotation in the example reference image 702, the SVD+pre-trained output 1104 can be further optimized to better cover the rear end of the car like the annotation in the example reference image 702. Finally, the optimized output 1106 from the expectation maximization accurately covers the rear part of the car.

Thresholding is a hyperparameter that is denoted by epsilon 'ε' which can be determined by a user or may be predefined within the automatic image annotation system 100 so that the threshold value can be selected by the ML-based model 422. The various bounding boxes that are generated for different values of epsilon and the corresponding values of the epsilon are shown in the schematic figures 1150. As seen from the schematic figures 1150, figure 1152 has the best annotation 1154 which is optimized to enclose the ROI 1156.

Figure 12:
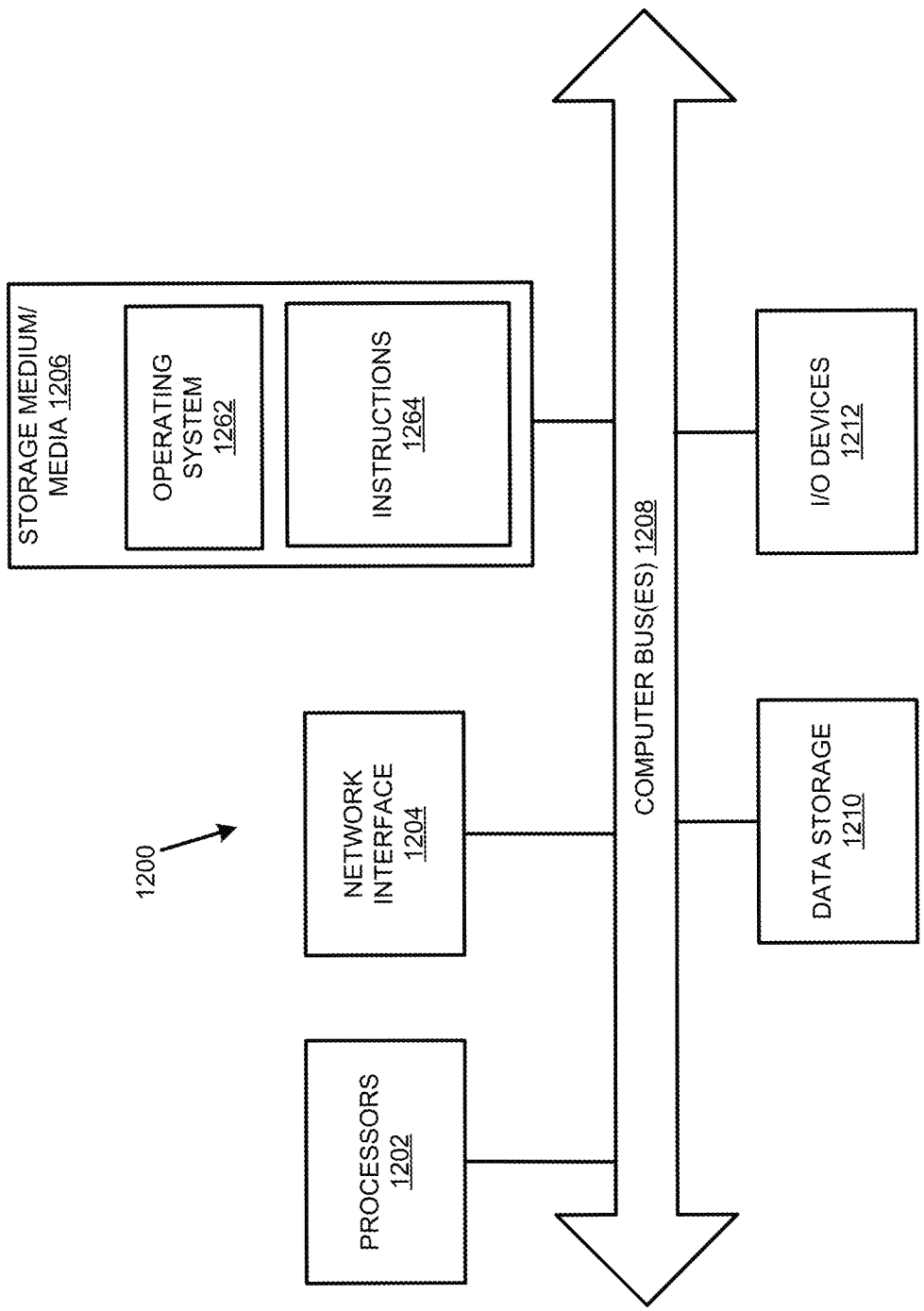
FIG. 12 illustrates a computer system that may be used to implement the automatic image annotation system in accordance with the examples disclosed herein.

FIG. 12 illustrates a computer system 1200 that may be used to implement the automatic image annotation system 100. More particularly, computing machines such as desktops, laptops, smartphones, tablets, and wearables which may be used to generate or access the data from the automatic image annotation system 100 may have the structure of the computer system 1200. The computer system 1200 may include additional components not shown and that some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit, ASIC or another type of processing circuit, input/output devices 1212, such as a display, mouse keyboard, etc., a network interface 1204, such as a Local Area Network (LAN), a wireless 802.12x LAN, a 3G, 4G or 5G mobile WAN or a WiMax WAN, and a processor-readable medium 1206. Each of these components may be operatively coupled to a bus 1208. The computer-readable medium 1206 may be any suitable medium that participates in providing instructions to the processor(s) 1202 for execution. For example, the processor-readable medium 1206 may be non-transitory or non-volatile medium, such as a magnetic disk or solid-state non-volatile memory or volatile medium such as RAM. The instructions or modules stored on the processor-readable medium 1206 may include machine-readable instructions 1264 executed by the processor(s) 1202 that cause the processor(s) 1202 to perform the methods and functions of the automatic image annotation system 100.

The automatic image annotation system 100 may be implemented as software stored on a non-transitory processor-readable medium and executed by the one or more processors 1202. For example, the processor-readable medium 1206 may store an operating system 1262, such as MAC OS, MS WINDOWS, UNIX, or LINUX, and code 1264 for the automatic image annotation system 100. The operating system 1262 may be multi-user, multiprocessing, multitasking, multithreading, real-time, and the like. For example, during runtime, the operating system 1262 is running and the code for the automatic image annotation system 100 is executed by the processor(s) 1202.

The computer system 1200 may include a data storage 1210, which may include non-volatile data storage. The data storage 1210 stores any data used by the automatic image annotation system 100. The data storage 1210 may be used to store the S-matrices, the lower-dimensional images, the vector representations, etc., and other data that is used or generated by the automatic image annotation system 100 during the course of operation.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An automatic image annotation system, comprising:
    at least one processor;
    a non-transitory processor-readable medium storing machine-readable instructions that cause the processor to:
    receive a reference image and at least one query image, wherein the reference image and the at least one query image include similar regions of interest and the reference image further includes at least one annotation highlighting the region of interest (ROI) therein;
    generate an S-matrix for the reference image wherein S-matrix includes singular values for the reference image;
    extract a low dimensional reference image with the at least one annotation from the reference image using a pre-trained deep learning model;
    obtain a vector representation of the reference image using a combination of the low dimensional reference image with the at least one annotation and the S-matrix of the reference image;
    determine a distance metric between the vector representation of the reference image with the at least one annotation and a vector representation of the query image;
    automatically generate a preliminary annotation covering at least a portion of the ROI in the at least one query image,
        wherein the preliminary annotation is similar to the at least one annotation of the reference image and the preliminary annotation is automatically generated based on the distance metric;
    provide a preliminary output image that includes the at least one query image with the preliminary annotation;
    optimize the preliminary annotation expectation maximization methodology and based on a threshold set for an object associated with the ROI in the query image; and
    produce a finalized output image with a finalized annotation that entirely covers the ROI in the at least one query image.

2. The automatic image annotation system of claim 1, wherein the preliminary annotation is an open geometric figure and the portion of the ROI includes the ROI in the query image.

3. The automatic image annotation system of claim 1, the processor is to further:
    enable display of the preliminary output image to a user; and
    receive a value of the threshold from the user in response to the display of the preliminary output image.

4. The automatic image annotation system of claim 1, the processor is to further:
    train a machine learning (ML) model using training data that includes different images wherein each image includes one or more optimized annotations and the training data further includes threshold values corresponding to the optimized annotations.

5. The automatic image annotation system of claim 4, the processor is to further:
    automatically determine a value for the threshold via the trained ML model.

6. The automatic image annotation system of claim 4, wherein the trained ML model is based on one of linear regression or non-linear regression.

7. The automatic image annotation system of claim 1, the processor is to further:
    generate an S-matrix for the at least one query image, wherein the S-matrix of the at least one query image includes singular values for the at least one query image;
    extract a low dimensional query image from the at least one query image using the pre-trained deep learning model; and
    obtain the vector representation of the query image using a combination of the low dimensional query image and the S-matrix of the at least query image.

8. The automatic image annotation system of claim 1, wherein singular value decomposition (SVD) is employed to generate the S-matrix of the reference image and the S-matrix of the at least one query image.

9. The automatic image annotation system of claim 1, wherein the pre-trained deep learning model includes a residual neural network (ResNet) without terminal layers.

10. The automatic image annotation system of claim 1, wherein the distance metric includes cosine similarity.

11. The automatic image annotation system of claim 1, wherein the preliminary annotation is similar in one or more of a shape and a color to the at least one annotation.

12. A method of automatically annotating and labeling images including:
   receiving a reference image and at least one query image, wherein the reference image and the at least one query image include similar regions of interest and the reference image further includes at least one annotation delineating the region of interest (ROI) included therein;
   generating an S-matrix for the reference image wherein S-matrix includes singular values for the reference image;
   extracting a low dimensional reference image with the at least one annotation from the reference image using a pre-trained deep learning model;
   obtaining a vector representation of the reference image with the at least one annotation by combining the S-matrix of the reference image with the low dimensional reference image;
   determining a distance metric between the vector representation of the low dimensional reference image with the at least one annotation and a vector representation of a low dimensional query image corresponding to the query image;
   identifying a preliminary region of interest (ROI) within the at least one query image based on the distance metric, wherein the preliminary ROI includes at least a portion of the ROI in the reference image delineated by the at least one annotation;
   generating a preliminary output image, wherein the preliminary output image includes the at least one query image with a preliminary annotation that delineates the preliminary ROI; and
   optimizing the preliminary annotation based on a threshold which indicates a difference between a distribution representative of the reference image and a distribution representative of the at least one query image and the optimization causes a resizing of the preliminary ROI.

13. The method of claim 12, further comprising:
   resizing a boundary box that forms the preliminary annotation based on the optimization so that the resized boundary box encloses an entire ROI of the query image.

14. The method of claim 12, wherein optimizing the preliminary annotation based on the threshold further includes:
   training a machine learning (ML) model to automatically generate threshold values corresponding to objects in the query image, wherein the ML model is trained using training data that includes different images wherein each image of the different images includes one or more optimized annotations; and
   automatically determining a value for the threshold via the trained ML model.

15. The method of claim 12, further including:
   generating an S-matrix for the at least one query image wherein the S-matrix of the at least one query image includes singular values for the at least one query image;
   extracting the low dimensional query image from the at least one query image using the pre-trained deep learning model; and
   obtaining the vector representation of the low dimensional query image.

16. The method of claim 15, wherein generating the S-matrix for the at least one query image further comprises:
   executing singular value decomposition (SVD) on a matrix representation of the at least one query image; and
   discarding two orthonormal matrices resulting from the SVD from further processing; and
   retaining a diagonal matrix including singular values of the matrix representation of the query image as the S-matrix of the at least one query image.

17. The method of claim 12, wherein receiving the reference image and the at least one query image further comprises:
   receiving the reference image and a plurality of query images via an upload to a cloud server, wherein the at least one query image includes the plurality of query images.

18. A non-transitory processor-readable storage medium comprising machine-readable instructions that cause a processor to:
   receive a reference image and at least one query image, wherein the reference image and the at least one query image include similar regions of interest and the reference image further includes at least one annotation highlighting the region of interest (ROI) therein;
   generate an S-matrix for the reference image wherein S-matrix includes singular values for the reference image;
   extract a low dimensional reference image with the at least one annotation from the reference image using a pre-trained deep learning model;
   obtain a vector representation of the reference image using a combination of the low dimensional reference image with the at least one annotation and the S-matrix of the reference image;
   determine a distance metric between the vector representation of the low dimensional reference image with the at least one annotation and a vector representation of a low dimensional query image associated with the query image;
   provide a preliminary output image based on the distance metric wherein the preliminary output image includes the at least one query image with a preliminary annotation that covers at least a portion of the ROI in the query image;
   optimize the preliminary annotation based on a threshold which indicates a difference between a distribution representative of the reference image and a distribution representative of the at least one query image and the optimization causes a resizing of the ROI; and
   resize a boundary box that forms the preliminary annotation based on the optimization so that the boundary box encloses the resized ROI.

* * * * *

UNITED STATES PATENT AND TRADEMARK OFFICE
CERTIFICATE OF CORRECTION

PATENT NO. : 11,531,829 B2
APPLICATION NO. : 16/938689
DATED : December 20, 2022
INVENTOR(S) : Sridhar Murugaraj et al.

It is certified that error appears in the above-identified patent and that said Letters Patent is hereby corrected as shown below:

In the Claims

At Claim 1, Column 12, Line 14, the phrase "annotation expectation" should instead read "annotation via expectation".

Signed and Sealed this
First Day of August, 2023

Katherine Kelly Vidal
*Director of the United States Patent and Trademark Office*